United States Patent
Killen, Jr. et al.

(10) Patent No.: US 10,037,782 B1
(45) Date of Patent: Jul. 31, 2018

(54) STORAGE ARRAY ENCLOSURE HAVING SIDEWALL STEP FOR USE WITH EXPANSION MODULE

(71) Applicant: Seagate Technology LLC, Cupertino, CA (US)

(72) Inventors: Odie Banks Killen, Jr., Colorado Springs, CO (US); David Dick Anderson, Jr., New Braunfels, TX (US); Kevin Van Pelt, Longmont, CO (US); David Michael Davis, Portsmouth (GB)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/614,899

(22) Filed: Jun. 6, 2017

(51) Int. Cl.
  *H05K 7/14*   (2006.01)
  *G11B 33/04*  (2006.01)
  *G06F 12/06*  (2006.01)
  *G06F 1/18*   (2006.01)

(52) U.S. Cl.
  CPC .......... *G11B 33/0466* (2013.01); *G06F 1/187* (2013.01); *G06F 12/0623* (2013.01)

(58) Field of Classification Search
  CPC ..... G06F 1/187; G06F 12/0623; H05K 7/183; H05K 7/1418; H05K 7/1422; H05K 7/186; H05K 7/1425; H05K 7/1438; H05K 7/1444; H05K 7/1487; H05K 7/1489; G11B 33/0466
  See application file for complete search history.

(56) References Cited

U.S. PATENT DOCUMENTS

| | | | |
|---|---|---|---|
| 9,363,926 B1* | 6/2016 | Beall | H05K 7/20736 |
| 9,448,601 B1* | 9/2016 | Beall | G06F 1/187 |
| 9,715,259 B1* | 7/2017 | Wang | H05K 7/1489 |
| 2001/0037985 A1* | 11/2001 | Varghese | G06F 1/16 211/26 |
| 2007/0230111 A1* | 10/2007 | Starr | G11B 33/125 361/679.31 |
| 2010/0118483 A1* | 5/2010 | Kurokawa | G06F 1/187 361/679.33 |
| 2011/0007464 A1* | 1/2011 | Leigh | H01R 9/2408 361/679.01 |
| 2013/0002106 A1* | 1/2013 | Crisan | G06F 1/187 312/223.2 |
| 2015/0009616 A1 | 1/2015 | Adrian et al. | |
| 2016/0219748 A1* | 7/2016 | Tsai | H05K 7/1489 |

* cited by examiner

*Primary Examiner* — Hoa C Nguyen
*Assistant Examiner* — Christopher L Augustin
(74) *Attorney, Agent, or Firm* — Hollingsworth Davis, LLC

(57) ABSTRACT

An enclosure has a sidewall with a step that results in an upper part of the sidewall extending over a slide mounting region. A backplane is located at a base of the enclosure and is configured to receive a plurality of data storage drives. A circuit carrier extends from the backplane to the step in the side of the enclosure. The circuit carrier has one or more connectors proximate an upper surface of the step and is configured to receive one or more expansion modules that expand a functionality of the backplane.

20 Claims, 8 Drawing Sheets

STORAGE ARRAY ENCLOSURE HAVING SIDEWALL STEP FOR USE WITH EXPANSION MODULE

SUMMARY

The present disclosure is related to a storage array enclosure having a sidewall step for use with an expansion module. In one embodiment, an apparatus includes an enclosure comprising at least one sidewall with a step that results in an upper part of the sidewall extending over a slide mounting region of the sidewall. The step results in the slide mounting region of the enclosure having a smaller width than a width of a top of the enclosure. A backplane is at a base of the enclosure. The backplane includes a plurality of connectors configured to receive a plurality of data storage drives. A circuit carrier extends from the backplane to the step in the side of the enclosure. The circuit carrier includes one or more connectors proximate an upper surface of the step and is configured to receive one or more expansion modules that expand a functionality of the backplane. The expansion modules are located in the step between the portion of the sidewall and one or more of the data storage drives when installed.

In another embodiment, a drive array enclosure includes at least one sidewall with a cavity over a slide mounting region of the sidewall. The at least one sidewall has an upper part that forms the cavity and a lower part below the cavity. A backplane is at a base of the enclosure and has a plurality of connectors configured to couple with a respective plurality of data storage drives. A circuit carrier extends from the backplane to the cavity. The circuit carrier has one or more connectors proximate the cavity. One or more expansion modules that expand a functionality of the backplane are located in the cavity and electrically coupled to the one or more connectors of the circuit carrier.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same components in multiple figures.

DETAILED DESCRIPTION

In the following description of various example embodiments, reference is made to the accompanying drawings that form a part hereof, and in which is shown by way of illustration various example embodiments. It is to be understood that other embodiments may be utilized, as structural and operational changes may be made without departing from the scope of the claims appended hereto.

The present disclosure is generally related to expander modules used in storage array enclosures. For example, a storage enclosure includes facilities for mechanically and electrically coupling a large number of hard disk drives (HDD) or other devices (e.g., solid-state drives (SSDs), optical drives, tape drives, monitoring devices) in a single enclosure. Generally, the enclosure may include a backplane circuit board that provides data and power connectivity for the individual devices. Such enclosure may include dedicated processors for managing data inputs and outputs to other nodes of a computing system. For example, a mass-storage enclosure may be configured as a storage server that provides persistent storage for nodes of a networked data center.

In some cases, the backplane can be configured to accept expansion modules that expand the functionality of the storage array. For example, a storage array may be selectably configured to handle different point-to-point storage protocols, such a Small Computer System Interface (SCSI), Serial Attached SCSI (SAS), Serial AT Attachment (SATA), Peripheral Component Interconnect (PCI), PCI Express (PCIe), Fibre Channel, Ethernet, etc. To do this, the backplane may accept one or more protocol expander modules that are electrically coupled to the backplane. Such a module can support data transfer different protocols.

Other expansion modules that expand storage array functionality may include sensor devices, monitoring devices (e.g., watchdog timer, bus monitors), power backup devices, etc. The enclosure and backplane provide power and physical connectivity for the expansion modules. The functional connectivity allow the operational modules access to all of the individual storage devices and associated input/output (I/O) busses, or a subset thereof.

Because data center operators want as much data storage as possible in as little space as possible, an expansion module should not sacrifice drive count. Further, such a module is often designed to be hot-swappable, meaning it can be removed and installed without powering down the entire storage array. Such capability is also associated with minimal physical effort to achieve the swap. For example, hot-swap operations may be tool-less and involve no or minimum enclosure disassembly. In the following disclosure, an apparatus include hot-swap features that meet these specifications, as well as maximizing available space for storage devices.

Figure 1:
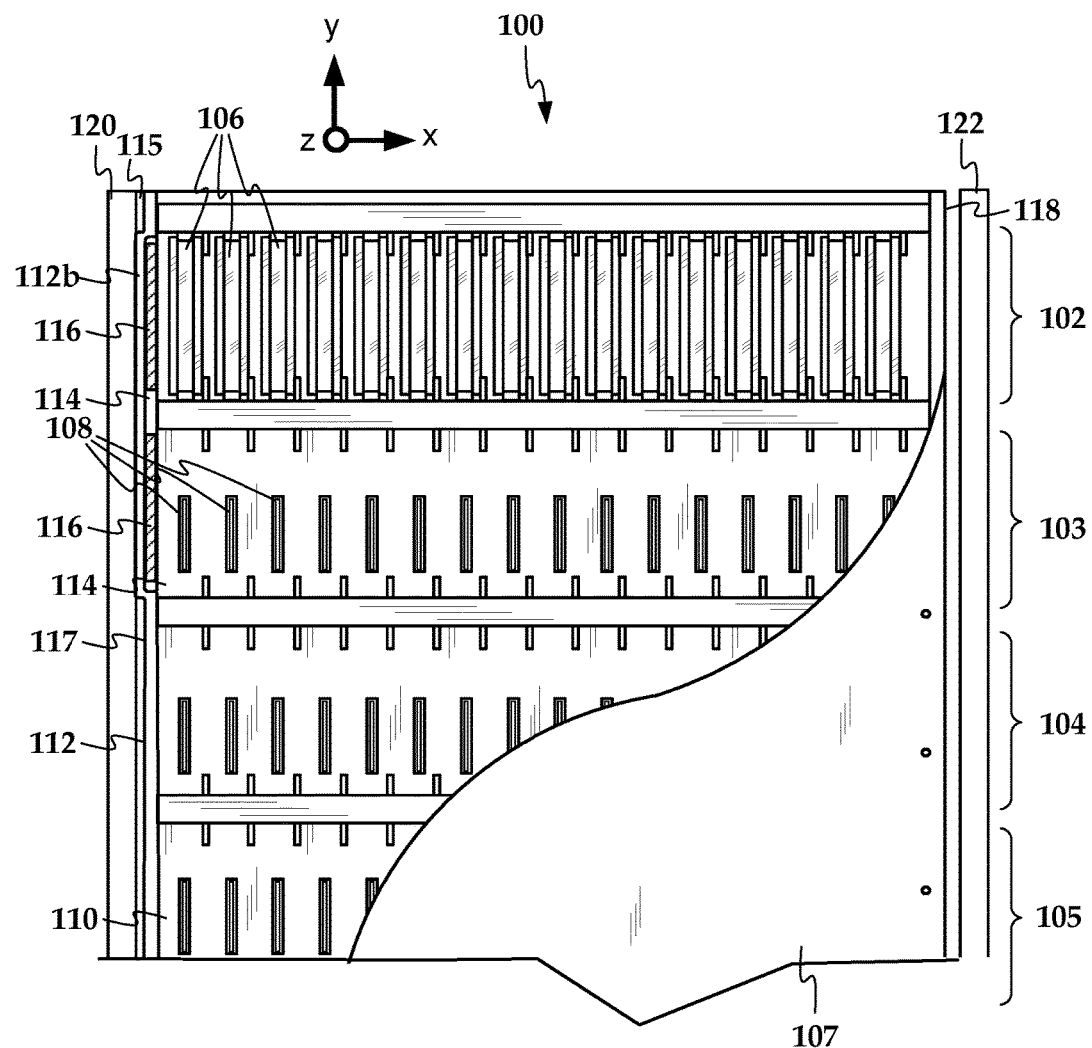
FIG. 1 is a top view of a drive array according to an example embodiment.

An example drive array enclosure 100 is shown in the partial top view of FIG. 1. The enclosure 100 includes rows 102-105 that each store a plurality of storage drives 106 (e.g., HDD, SSD) or other compatible devices. Row 102 is shown with drives installed, and rows 103-105 are shown without hard drives or other devices installed. A cover 107 is shown on top of the enclosure 100. The cover 107 is shown partially cutaway to reveal the interior of the enclosure 100.

The storage drives 106 interface with connectors, e.g., connectors 108, coupled to a backplane 110 (also sometimes referred to as baseplane, baseboard, motherboard, etc.). The storage drives 106 are oriented such that a major surface (e.g., one of the largest sides or covers of the drive) is perpendicular to the backplane 110. The connectors 108 provide data and power lines to the storage devices 106, as well as some amount of physical support. Other parts of the enclosure, such as side rails, locks, etc. also provide physical support for the drives.

Figure 2:
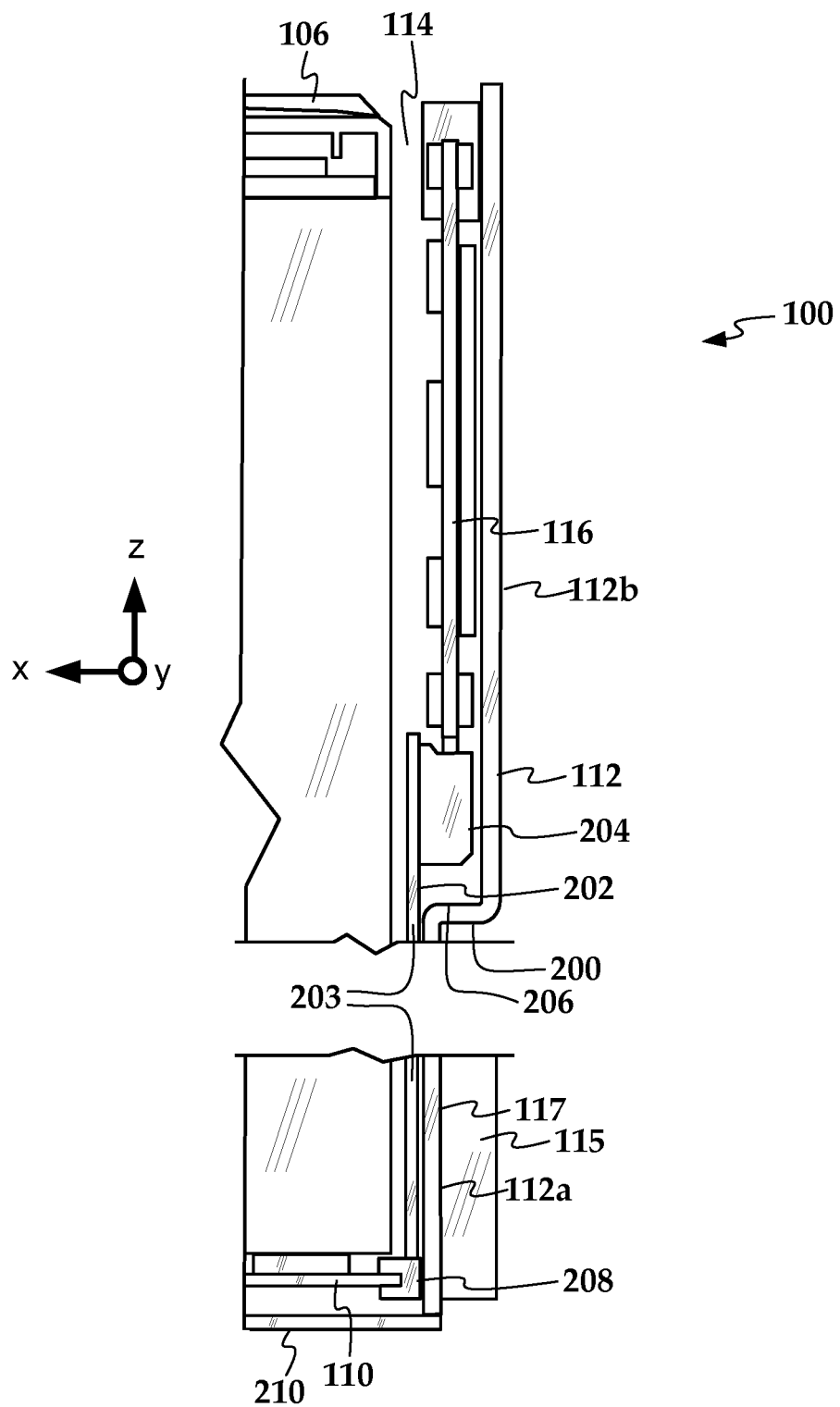
FIGS. 2 and 3 are side and perspective views showing details of an enclosure according to an example embodiment.

Shown on sidewall 112 of the enclosure 100 is a cavity 114 formed via a step (not shown) that defines an upper part 112b of the sidewall 112. The cavity 114 extends over a slide mounting 117 region, as indicated by slide 115. Slide mounting region 117 is best seen in FIG. 2. As will be shown in subsequent figures, the step includes a bend or similar feature in the sidewall that results in a slide mounting region 117 of the enclosure having a smaller width (x-dimension) than a top of the enclosure 100. The maximum top width of the enclosure 100 is defined by the upper part 112b of the sidewall 112 and an opposing side 118. The base (which is defined by a lower part of the sidewall 112 and the opposing side) may also have a smaller dimension than the top (e.g., the same as slide mounting region 117), although in some embodiments the base may also be wider than the slide mounting region 117 on one or both sides. Generally, the smaller width of at least the slide mounting region corresponds to a space that is filled by the storage drives 106.

As seen in this view, the base is substantially covered by backplane 110 and the top of the enclosure is encompassed by the cover 107. The illustrated cavity 114 only extends partway along the length (y-dimension) of the enclosure, although in other embodiments the cavity 114 and associated step may extend the full length of the enclosure 100. Further, while cavity 114 is shown on only one sidewall 112 of the enclosure 100, a similar cavity may be included on an opposite sidewall 120 of the enclosure. Generally, the cavity 114 (or cavities) do not extend past the slide 115 (or slides) in the x-direction such that the enclosure can still fit within a standard size opening width, as indicated by sides 120 and 122 of a rack in which the enclosure 100 is mounted. For example, the Electronic Industries Alliance defines particulars of standard 19-inch racks, and the European Telecommunications Standards Institute defines particulars of what are sometimes referred to as 21-inch racks. For some applications, standard 23-inch racks are used.

One or more expansion modules 116 are located in the cavity 114. The expansion modules are coupled to the backplane 110 via a circuit carrier (not shown) extending from the backplane to the step in the side of the enclosure. An expansion module 116 can be hot-swapped from the enclosure 100 by removing the cover 107 and then sliding the module 116 out the top (z-direction). The expansion modules 116 can be removed without removing any of the drives 106. Further, because the cavity 114 in which the modules 116 use space that would otherwise be a gap between the enclosure 100 and the rack, there is no negative impact on the number of drives 106 that can be located in the enclosure 100.

Figure 3:
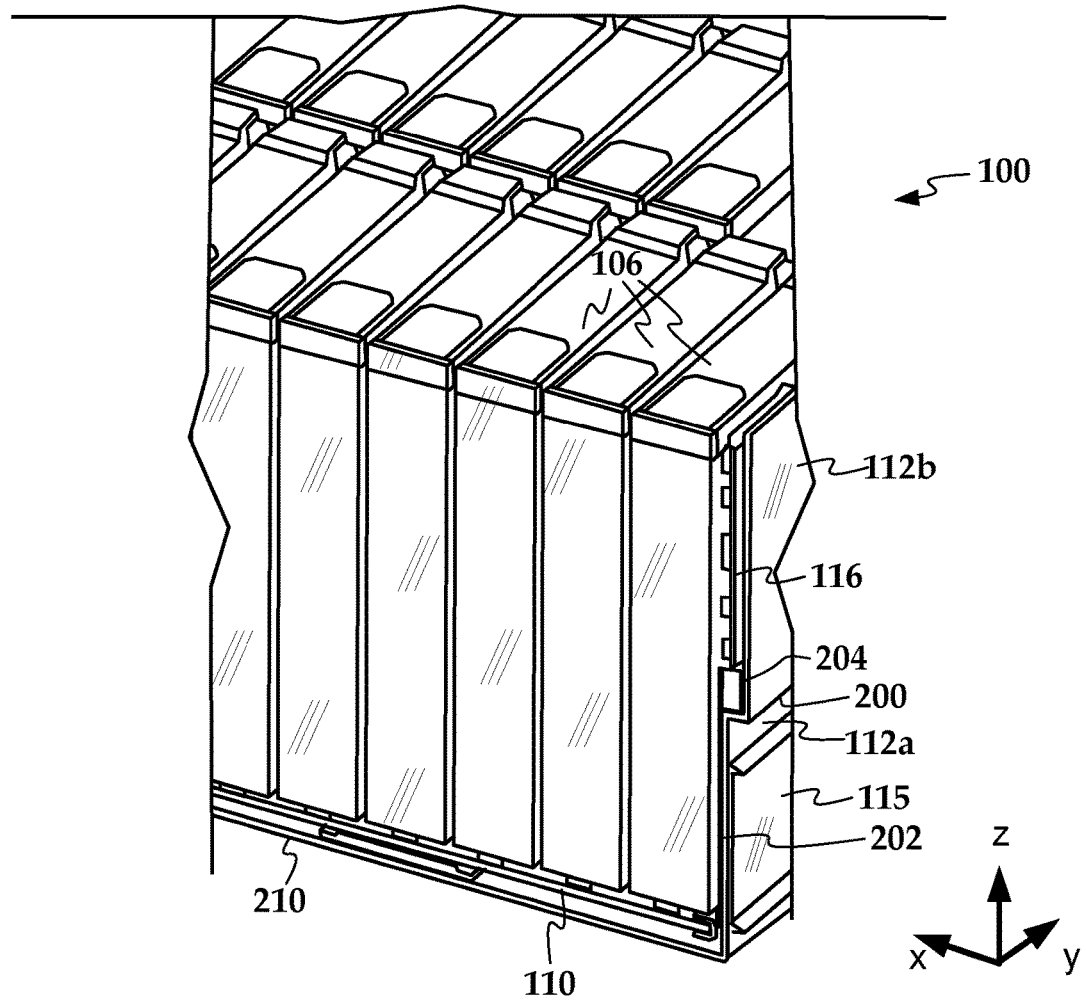

In FIGS. 2 and 3, side and perspective views show details of an enclosure 100 according to an example embodiment. As best seen in FIG. 2, a step 200 formed in sidewall 112 is visible, the step 200 forming cavity 114. A circuit carrier 202 extends from the backplane 110 to the step 200. The circuit carrier 202 has one or more connectors 204 proximate an upper surface 206 of the step 200. A planar portion 203 of the circuit carrier 202 extends along (and may be supported by) a lower 112a portion of the sidewall 112. The circuit carrier 202 is configured to receive one or more expansion modules 116 that expand a functionality of the backplane 110. The circuit carrier 202 may include a circuit board, flex cable, or any other planar structure that carries at least conductive pathways that couple the expansion module 116 to the backplane 110. The circuit carrier 202 may also include electronic components, e.g., surface mounted passive or active electronic devices bonded to some of the conductive pathways. The circuit carrier 202 may attach to the backplane 110 via an edge connector 208, and may be structurally supported by the backplane 110 and/or a lower part 112a of the sidewall 112.

The step 200 is sized so that an upper part 112b of the sidewall 112 does not extend past a slide 115 that is mounted in the slide mounting region 117 in the lower part 112b of the sidewall 112. For example the upper part 112b may extend approximately flush with the slide 115, e.g., within manufacturing tolerances. This allows the enclosure 100 to fit in a standard sized rack. Generally, such a rack will have a predefined front opening width W (e.g., W=19 inch) and the enclosure at the slide mounting region 117 can have a maximum width of $W-2W_s$, where $W_s$ is the width of the slide 115. The use of a stepped sidewall 112 can increase width at the upper part 112b to $W_s$-ε on either side of the enclosure, where c is a relatively small dimension to account for manufacturing tolerances and is intended to keep the upper part 112b from interfering with the opening of the rack in which it is mounted.

The upper part 112b may have a maximum vertical dimension (z-direction) that equal to the total height of the enclosure 100 minus the height of the slide 115. In some configurations, the slide 115 and slide mounting region 117 may be centrally mounted along the z-direction, and the lower part of the sidewall 112a may include a second step that forms a bottom-facing cavity similar to cavity 114. In such a case, the bottom cover 210 of the enclosure may also be removable to access bottom-accessible expansion modules can be used. Bottom-accessible modules may place limits on how close the floor the enclosure may be mounted.

Figures 4, 5:
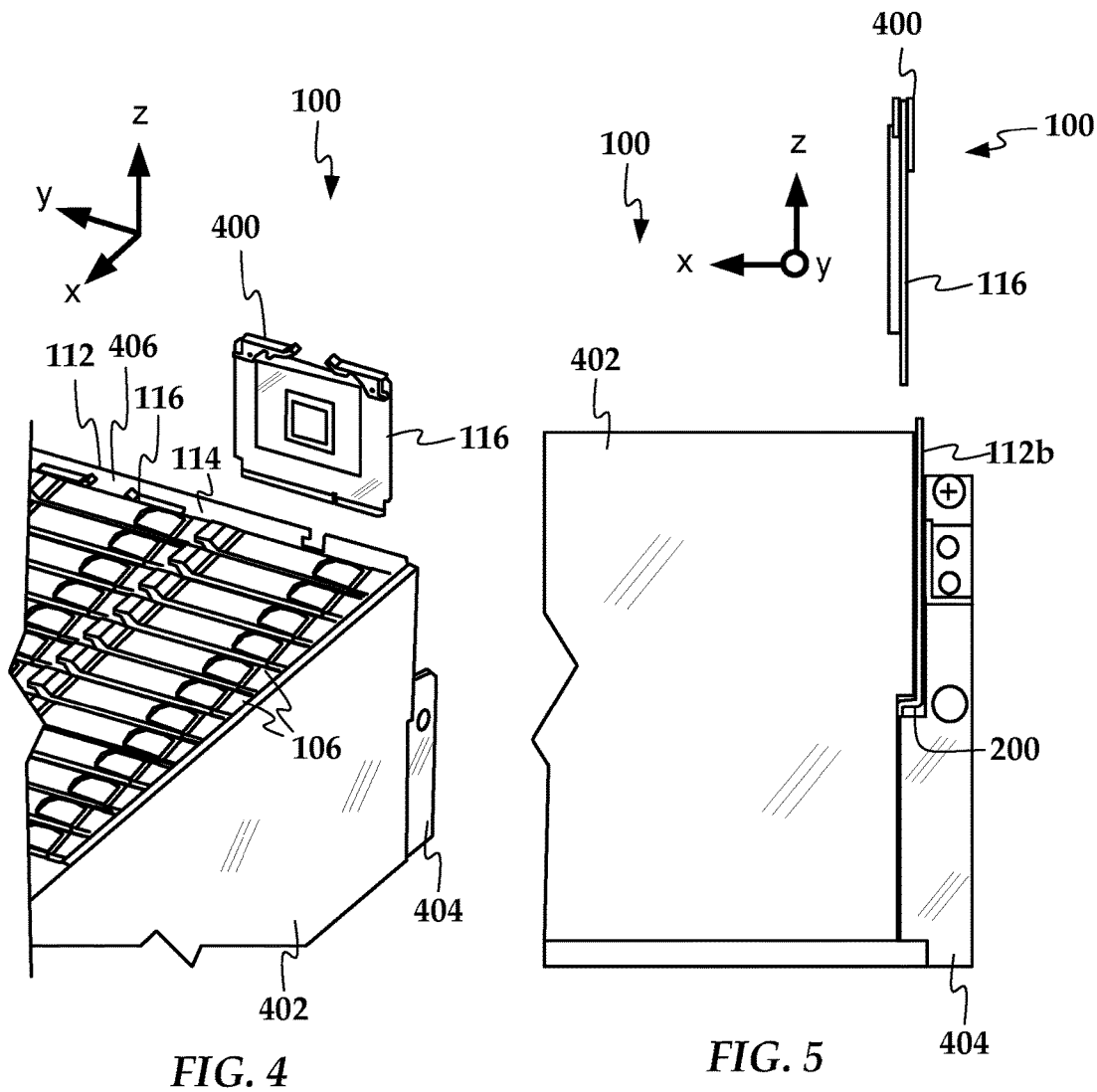
FIG. 4 is a perspective view showing detail of an expansion module being removed from an enclosure according to an example embodiment.
FIGS. 5 and 6 are front and perspective views showing the details of the expansion module and enclosure shown in FIG. 4.
Figure 6:
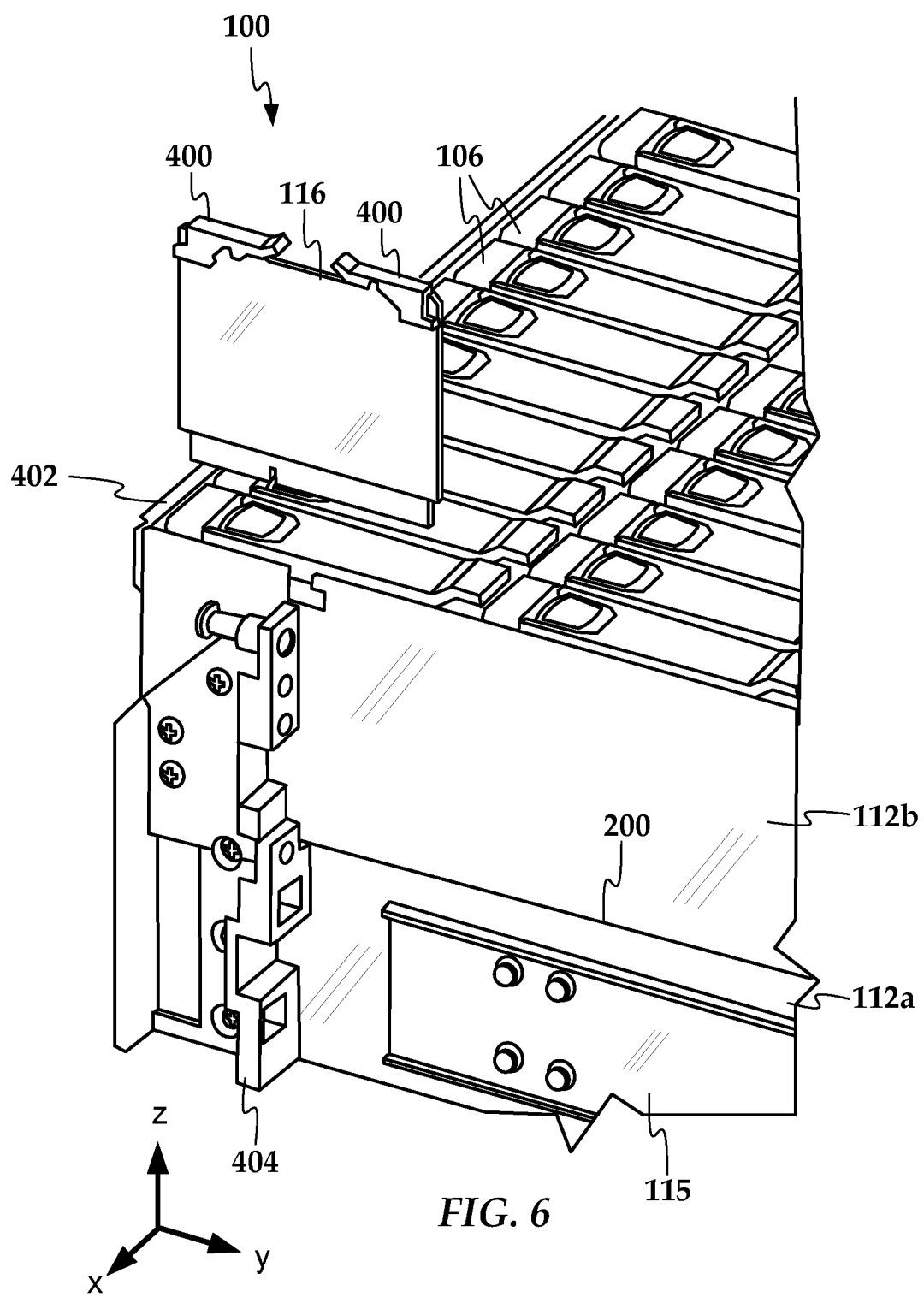

In FIGS. 4, 5, and 6, perspective and views shows detail of an expansion module 116 being removed from an enclosure 100 according to an example embodiment. Note that these views are at a front of the enclosure 100, where front panel 402 and rack attachment bracket 404 can be seen. With the top cover removed, an expansion module 116 can be slidably removed by optionally releasing latches 400 or other tool-less fastener and pulling the module 116 upwards. A replacement module 116 is installed by positioning the module in the cavity 114, pressing the module into the connector on the circuit carrier, and then optionally engaging the latches 400 or other fasteners. An adjacent module 116 is shown installed at region 406 in FIG. 4.

Figure 7:
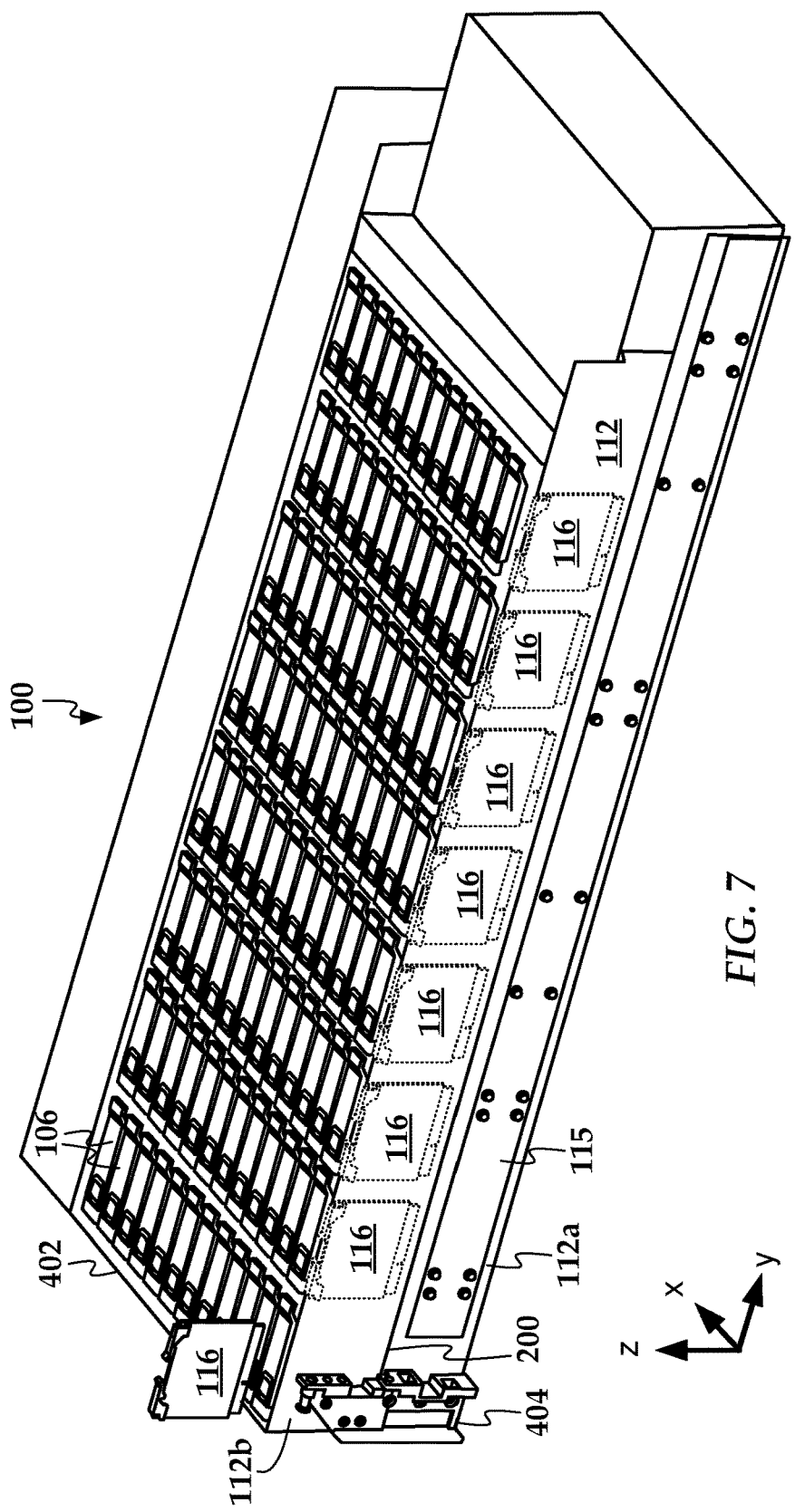
FIGS. 7 and 8 are back and front perspective views of an enclosure according to an example embodiment.

In FIG. 7, a back perspective view shows additional details of an enclosure 100 according to an example embodiment. Note that the step 202 in this example extends the entire length of the sidewall 112, such that the entire upper sidewall region 112b can be used for storing expansion modules 116. In this example this allows installing eight expansion modules 116, one for each row of storage devices 106.

Figure 8:
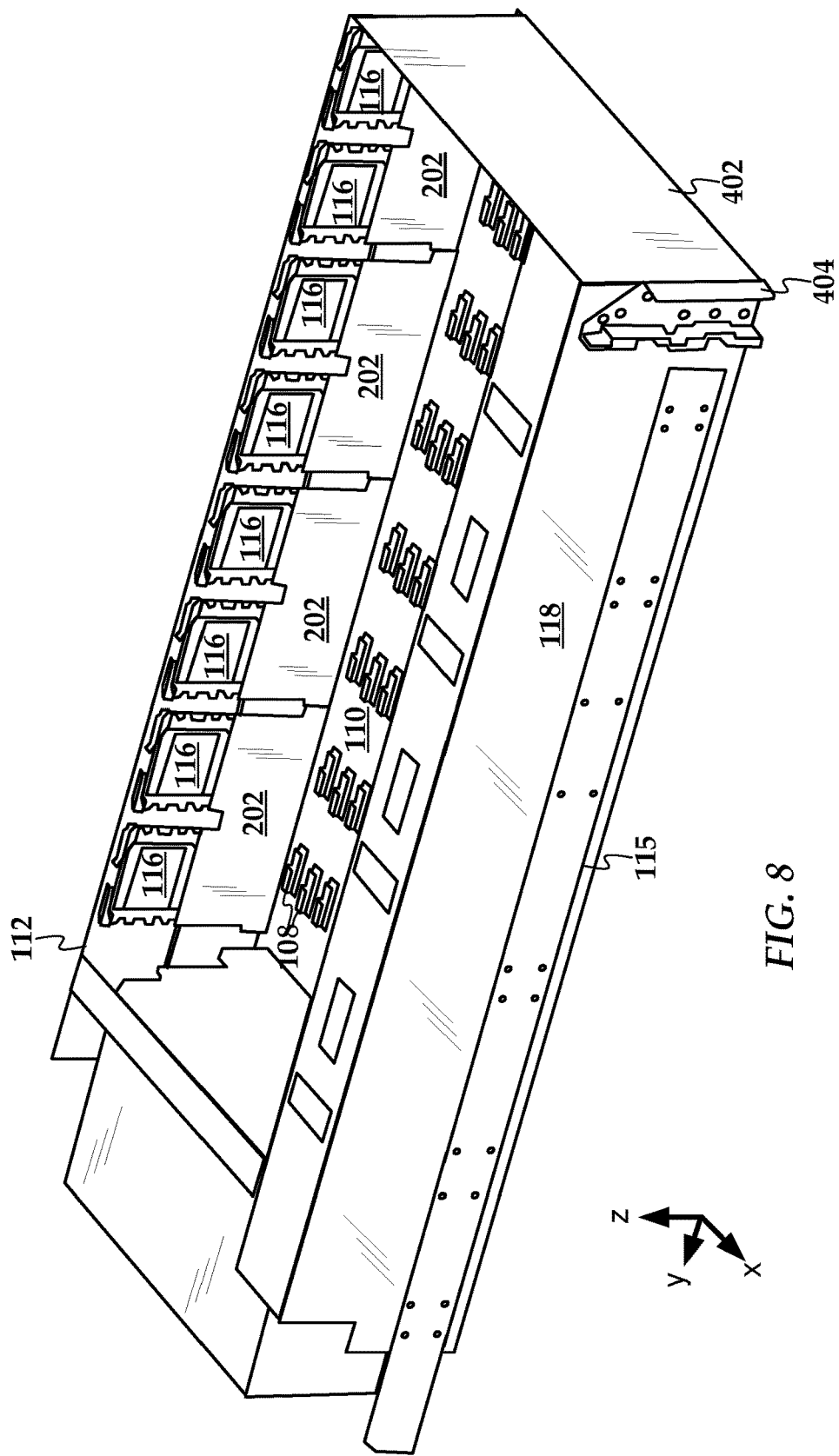

In FIG. 8, a front perspective view shows additional details of an enclosure 100 according to an example embodiment. In this view, the storage drives and top cover are both removed. The installed expansion modules 116 can be seen in this view, as well as the circuit carriers 202. Note that there is one circuit carrier 202 for every two expansion modules 116 in this example, such that each circuit carrier has one planar portion and two expansion module connectors. Other arrangements may be used, including a single circuit carrier 202 and one or more circuit carrier 202 for each expansion module 116. As seen in this view, the opposing sidewall 118 does not have a step or cavities, however it will be understood that in some cases, either or both sidewalls 112, 118 may have a cavity along part or full length, such cavity be configured for use with similar circuit carriers and expansion modules as described herein.

Figure 9:
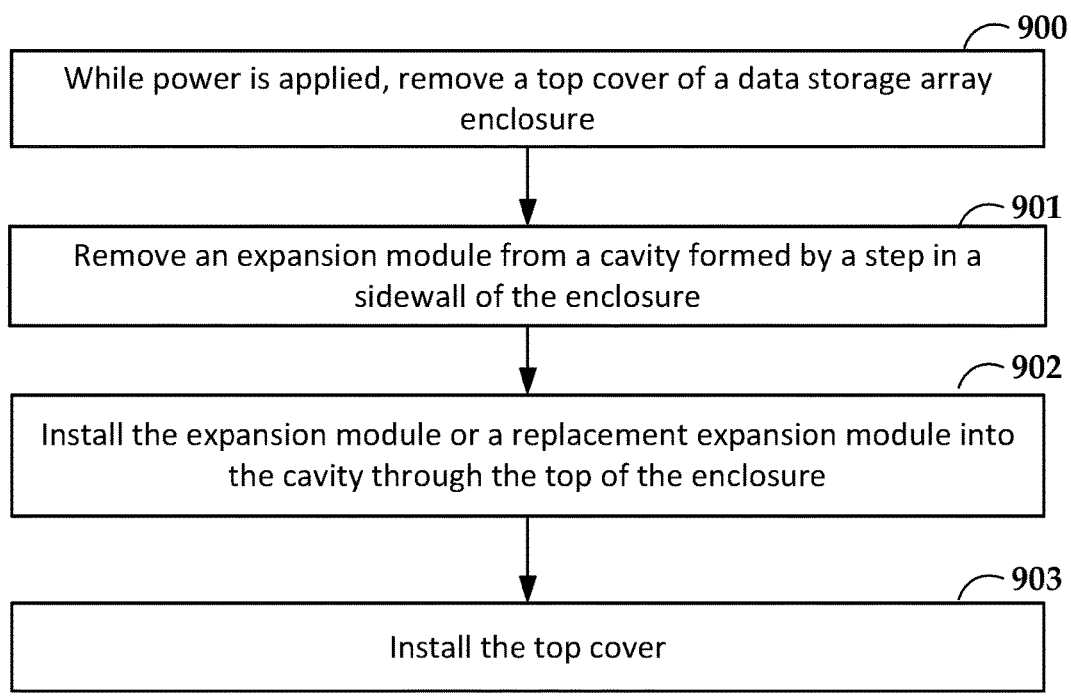
FIG. 9 is a flowchart of a method according to an example embodiment.

In FIG. 9, a flowchart illustrates a method according to an example embodiment. The method involves, while power is applied to a data storage array, removing 900 a top cover of an enclosure that houses data storage array. After removing 900 the top cover and with the power still applied, an expansion module is removed 901 from a cavity formed by a step in a sidewall of the enclosure. The expansion module is coupled to the backplane via a circuit carrier that extends from the baseplane along a lower part of sidewall below the step. The expansion module is hot-swappable from the data storage array through a top of the enclosure. The method further involves, with the power still applied, installing 902 either one of the expansion module or a replacement expansion module into the cavity through the top of the enclosure. The top cover is then installed 903 to the enclosure.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. An apparatus, comprising:
   an enclosure comprising at least one sidewall with a step that results in an upper part of the sidewall extending over a slide mounting region of the sidewall, the step resulting in the slide mounting region of the enclosure having a smaller width than a width of a top of the enclosure;
   a backplane at a base of the enclosure, the backplane comprising a plurality of connectors configured to receive a plurality of data storage drives; and
   a circuit carrier extending from the backplane to the step in the side of the enclosure, the circuit carrier comprising one or more connectors proximate an upper surface of the step and configured to receive one or more expansion modules that expand a functionality of the backplane, the expansion modules being located in the step between the portion of the sidewall and one or more of the data storage drives when installed.

2. The apparatus of claim 1, wherein the expansion modules are slidably hot-swappable via the top of the enclosure.

3. The apparatus of claim 1, wherein the storage drives fill the smaller width and extend to the top of the enclosure when installed.

4. The apparatus of claim 1, wherein the expansion modules comprise one or more protocol expansion modules.

5. The apparatus of claim 1, wherein the step extends along a full length of the sidewall.

6. The apparatus of claim 1, wherein the at least one sidewall comprises the upper part above the step and a lower part below the step, wherein the upper part extends approximately flush with a slide mounted in the slide region.

7. The apparatus of claim 6, wherein the upper part of the sidewall forms a cavity in which the one or more expansion modules are mounted.

8. The apparatus of claim 6, wherein the circuit carrier comprises a planar portion supported by the lower part of the sidewall.

9. The apparatus of claim 1, wherein the width of the top of the enclosure does not exceed a standard rack opening width.

10. The apparatus of claim 1, wherein the circuit carrier comprises a plurality of planar circuit carriers.

11. A drive array enclosure, comprising:
    at least one sidewall with a cavity over a slide mounting region of the sidewall, the at least one sidewall comprising an upper part that forms the cavity and a lower part below the cavity;
    a backplane at a base of the drive array enclosure, the backplane comprising a plurality of connectors configured to couple with a respective plurality of data storage drives;
    a circuit carrier extending from the backplane to the cavity, the circuit carrier comprising one or more connectors proximate the cavity; and
    one or more expansion modules that expand a functionality of the backplane, the expansion modules being located in the cavity and electrically coupled to the one or more connectors of the circuit carrier.

12. The drive array enclosure of claim 11, wherein the expansion modules are slidably removable via a top of the drive array enclosure.

13. The drive array enclosure of claim 12, wherein the expansion modules comprise hot-swappable protocol expansion modules.

14. The drive array enclosure of claim 11, wherein the cavity extends along a full length of the sidewall.

15. The drive array enclosure of claim 11, wherein the upper part of the sidewall extends approximately flush with a slide mounted to the lower part of the of the sidewall.

16. The drive array enclosure of claim 11, wherein the circuit carrier comprises a planar portion supported by the lower part of the sidewall.

17. The drive array enclosure of claim 11, wherein a maximum width of the enclosure is defined by the upper part of the sidewall and an opposing sidewall, the maximum width not exceeding a standard rack opening width.

18. A system comprising:
    an enclosure comprising at least one sidewall with a step that forms a cavity over a slide mounting region of the sidewall, the at least one sidewall comprising an upper part above the step and a lower part below the step, wherein the upper part extends approximately flush with a slide mounted on the lower part of the sidewall;
    a backplane at a base of the enclosure, the backplane comprising a plurality of connectors;
    a plurality of data storage drives coupled to the plurality of connectors of the backplane;
    a circuit carrier extending from the backplane to the cavity along the lower part of the sidewall, the circuit carrier comprising a planar portion proximate the lower part of the sidewall and one or more connectors proximate the cavity; and
    one or more expansion modules that expand a functionality of the backplane, the expansion modules being located in the cavity and electrically coupled to the one or more connectors of the planar circuit carrier.

19. The system of claim 18, wherein the plurality of data storage drives fill a width of the enclosure, the width defined by the lower part of the step and an opposing sidewall.

20. The system of claim 18, wherein a maximum width of the enclosure is defined by the upper part of the sidewall and an opposing sidewall, the maximum width not exceeding a standard rack opening width.

* * * * *